(12) United States Patent
Thompson et al.

(10) Patent No.: US 11,613,861 B1
(45) Date of Patent: Mar. 28, 2023

(54) FIXED MOUNTED BUOY SYSTEM

(71) Applicant: National Docks, LLC, Deland, FL (US)

(72) Inventors: Phillip Thompson, Deland, FL (US); Juddson Tyler Spore, Deland, FL (US)

(73) Assignee: National Docks, LLC, Deland, FL (US)

( * ) Notice: Subject to any disclaimer, the term of this patent is extended or adjusted under 35 U.S.C. 154(b) by 0 days.

(21) Appl. No.: 17/534,240

(22) Filed: Nov. 23, 2021

(51) Int. Cl.
*E02B 3/26* (2006.01)
*B63B 59/02* (2006.01)

(52) U.S. Cl.
CPC ............... *E02B 3/26* (2013.01); *B63B 59/02* (2013.01)

(58) Field of Classification Search
CPC . E02B 3/26; E02B 3/28; E02B 17/003; B63B 59/02; B63B 2059/025
USPC ................................ 405/211, 211.1, 212–216
See application file for complete search history.

(56) References Cited

U.S. PATENT DOCUMENTS

| | | | |
|---|---|---|---|
| 3,145,685 A * | 8/1964 | Kulick, Sr. | B63B 59/02 |
| | | | 114/220 |
| 6,112,690 A * | 9/2000 | Anderson | E02B 3/24 |
| | | | 114/220 |
| 6,406,221 B1 | 6/2002 | Collier | |
| 2016/0145822 A1* | 5/2016 | Gerst | B63B 59/02 |
| | | | 114/220 |
| 2019/0338819 A1* | 11/2019 | Nail | E02B 3/26 |

* cited by examiner

*Primary Examiner* — Sunil Singh

(57) ABSTRACT

A system includes a hole-through-middle (HTM) fender, a threaded rod passing through the fender such that the fender is configured to rotate with respect to the rod about an axis, a protective sheath surrounding the rod, and first and second mounting brackets into which the rod is threaded.

17 Claims, 12 Drawing Sheets

FIXED MOUNTED BUOY SYSTEM

TECHNICAL FIELD

The present disclosure relates to a fixed mounted fender system, in particular, to a system including a rotating hole-through-middle (HTM) fender, threaded rod, and mounting brackets designed to be attached to a fixed structure near where watercraft travel, such as hard docks, pilings, or seawalls.

BACKGROUND

It is desirable to protect a watercraft as such watercraft is docking, docked, being undocked, or is otherwise in a docking environment. Conventionally, dock ropes or stationary fenders are employed either on the watercraft itself or on a fixed structure to which the watercraft is to be docked. However, incursion with objects such as dock coping, carpet, pilings, seawalls, or improperly placed fenders or other hard objects may cause undesirable rubbing against the watercraft, often marring or damaging the finish, gelcoat, fiberglass, rub rails, or other portions of such watercraft.

Therefore, there is a need for a fixed mounted fender system that prevents unwanted contact with a fixed structure (e.g., hard dock, piling, seawall) during docking, undocking, or mooring, namely by providing a permanently-affixed system to be placed anywhere within the docking environment to create a relatively softer, rolling/rotating contact point(s) which can accommodate watercrafts of varying lengths and sizes. Out of the aforementioned drawbacks was born the systems described herein.

SUMMARY

In one example, a system is provided. The system includes a fender. The fender extends from a first end to a second end thereof. The fender extends from the first end to the second end thereof along an axis. The fender defines a first opening. The first opening is at the first end of the fender. The fender also defines a second opening. The second opening is at the second end of the opening. The system further includes a rod. The rod extends from a first end to a second end thereof. The rod extends from the first end to the second end thereof along an axis. The rod passes through the first opening of the fender. The rod also passes through the second opening of the fender. The fender is configured to rotate with respect to the rod about the axis. The system further includes a first mounting bracket. The first mounting bracket interfaces with the rod. The first mounting bracket interfaces with the rod at the first end of the rod. The system further includes a second mounting bracket. The second mounting bracket interfaces with the rod. The second mounting bracket interfaces with the rod at the second end of the rod. The rod extends through the fender. The rod extends through the fender between the first mounting bracket and the second mounting bracket.

In some examples, the fender may be a hole-through-middle (HTM) fender.

In variations, the rod may be threaded at its first end. In the same or other variations, the rod may be threaded at its second end. The first end of the rod may threadingly interface with (e.g., by being threaded into) the first mounting bracket. The second end of the rod may threadingly interface with (e.g., by being threaded into) the second mounting bracket.

In particular examples, the system may further include a protective sheath. The protective sheath may surround at least a portion of the rod. The protective sheath can be resistant to corrosion.

In some examples, the fender may include a plurality of fenders. The plurality of fenders may be arranged side-by-side. The rod may extend through each of the plurality of fenders. Each of the plurality of fenders may be configured to rotate independently with respect to the rod. The rod may extend through each of the plurality of fenders between the first mounting bracket and the second mounting bracket.

In certain constructions, each of the first mounting bracket and the second mounting bracket may include an elongate base plate. The base plate may extend substantially perpendicular to the axis. The base plate may be configured to interface with the rod. The base plates may be configured to interface with the rod at a corresponding one of the first and second ends of the rod.

In constructions, the base plate may define a first aperture. The first aperture defined in the base plate may be configured to receive at least a portion of the rod (e.g., in threading engagement therewith). The rod may be threaded at the first end thereof. The first aperture defined in the base plate may be tapped. The first aperture defined in the base plate may be configured to receive the threaded first end of the rod.

In variations, each of the first mounting bracket and the second mounting bracket may include an elongate anchor plate. The anchor plate may be connected to the base plate. The anchor plate may extend substantially perpendicular to the base plate. The anchor plate may define at least one opening. The anchor plate may be configured to be attached to a fixed structure by a fastener passing through the at least one opening.

In constructions, the base plate may include one or more engagement features. In the same or other constructions, the anchor plate may include one or more engagement features. The one or more engagement features of the anchor plate may be sized and shaped complementary to and configured to engage with the one or more engagement features of the base plate so as to connect the anchor plate and the base plate to one another. In constructions, the one or more engagement features of the anchor plate may be formed as recesses defined in a body of the anchor plate. In the same or other constructions, the one or more engagement features of the base plate may be formed as projections extending outwardly away from a body of the base plate.

In variations, each of the first mounting bracket and the second mounting bracket may include an elongate strut plate. The strut plate may be connected to the base plate. The strut plate may also be connected to the base plate. The strut plate may extend substantially perpendicular to each of the anchor plate and the base plate.

In constructions, the base plate may include one or more engagement features. In the same or other constructions, the anchor plate may include one or more engagement features. In the same or other constructions, the strut plate may include a first set of engagement features and a second set of engagement features. The first set of engagement features of the strut plate may be sized and shaped complementary to and configured to engage with the one or more engagement features of the base plate so as to connect the strut plate and the base plate to one another. The second set of engagement features of the strut plate may be sized and shaped complementary to and configured to engage with the one or more engagement features of the anchor plate so as to connect the strut plate and the anchor plate to one another. In constructions, the one or more engagement features of the anchor plate may be formed as recesses defined in a body of the anchor plate. In the same or other constructions, the one or more engagement features of the base plate may be formed as recesses defined in a body of the base plate. In the same or other constructions, the first set of engagement features of the strut plate may be formed as projections extending outwardly away from a body of the strut plate. In the same or other constructions, the second set of engagement features of the strut plate may be formed as projections extending outwardly away from the body of the strut plate.

In another example, a method of attaching a system as described herein to a fixed structure is provided. The method includes connecting the first end of the rod to the first mounting bracket. The method further includes passing the rod through each of the first opening and the second opening of the fender. The method further includes connecting the second end of the rod to the second mounting bracket. The method further includes attaching the first mounting bracket to the fixed structure. The method further includes attaching the second mounting bracket to the fixed structure.

In constructions, the rod is threaded at each of the first end thereof and the second end thereof. Connecting the first end of the rod to the first mounting bracket may include threading the first end of the rod into the first mounting bracket. Connecting the second end of the rod to the second mounting bracket may include threading the second end of the rod into the second mounting bracket.

In variations, the first mounting bracket and the second mounting bracket are laterally spaced apart from one another, such that the fender rotates with respect to the rod about a lateral axis. In other variations, the first mounting bracket and the second mounting bracket are vertically spaced apart from one another, such that the fender rotates with respect to the rod about a vertical axis.

In variations, the method further includes surrounding at least a portion of the rod with a protective sheath.

In another example, a system is provided. The system includes: a hole-through-middle (HTM) fender extending from a first end to a second end thereof along an axis, the fender defining a first opening at the first end thereof and a second opening at the second end thereof a rod extending from a threaded first end to a threaded second end thereof along the axis of the fender and passing through each of the first opening and the second opening of the fender, such that the fender is configured to rotate with respect to the rod about the axis; a protective sheath surrounding at least a portion of the rod; a first mounting bracket into which the first end of the rod is threaded and a second mounting bracket into which the second end of the rod is threaded, such that the rod extends through the fender between the first mounting bracket and the second mounting bracket, wherein each of the first mounting bracket and the second mounting bracket includes: an elongate base plate extending substantially perpendicular to the axis and configured to threadingly receive the rod at a corresponding one of the first and second ends thereof, the base plate including a first set of engagement features and a second set of engagement features; an elongate anchor plate connected to the base plate, the anchor plate extending substantially perpendicular to the base plate and including a first set of engagement features and a second set of engagement features; and an elongate strut plate connected to each of the anchor plate and the base plate, the strut plate extending substantially perpendicular to each of the anchor plate and the base plate and including a first set of engagement features and a second set of engagement features, wherein the first set of engagement features of the anchor plate are sized and shaped complementary to and configured to engage with the first set of engagement features of the base plate so as to connect the anchor plate and the base plate to one another, wherein the first set of engagement features of the strut plate are sized and shaped complementary to and configured to engage with the second set of the engagement features of the base plate so as to connect the strut plate and the base plate to one another, and wherein the second set of engagement features of the strut plate are sized and shaped complementary to and configured to engage with the second set of engagement features of the anchor plate so as to connect the strut plate and the anchor plate to one another.

BRIEF DESCRIPTION OF THE DRAWINGS

The following description of the illustrative examples may be better understood when read in conjunction with the appended drawings. It is understood that potential examples of the disclosed systems and methods are not limited to those depicted.

DETAILED DESCRIPTION

Figure 1:
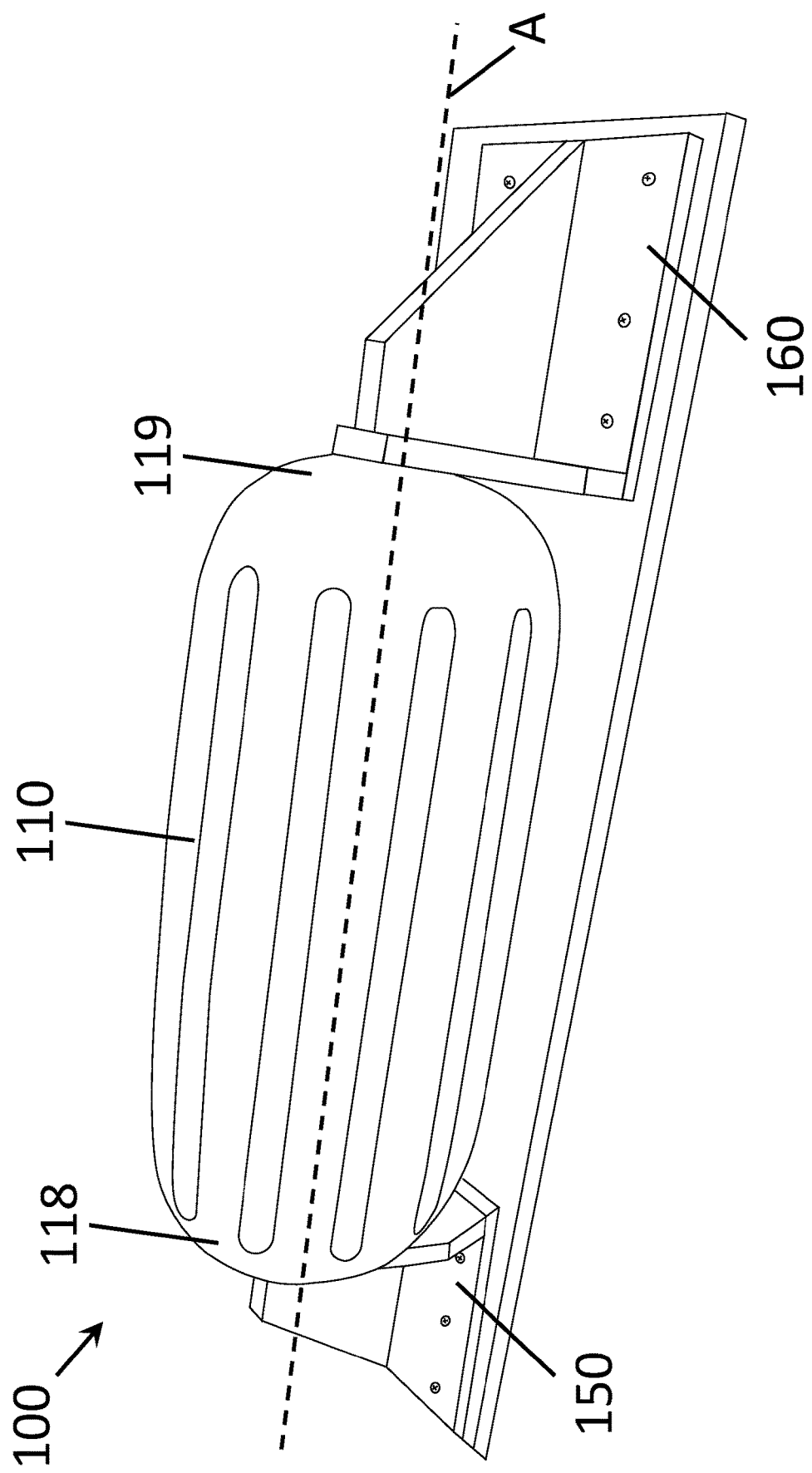
FIG. 1 shows a perspective view of a fixed mounted fender system according to one example.
Figure 2:
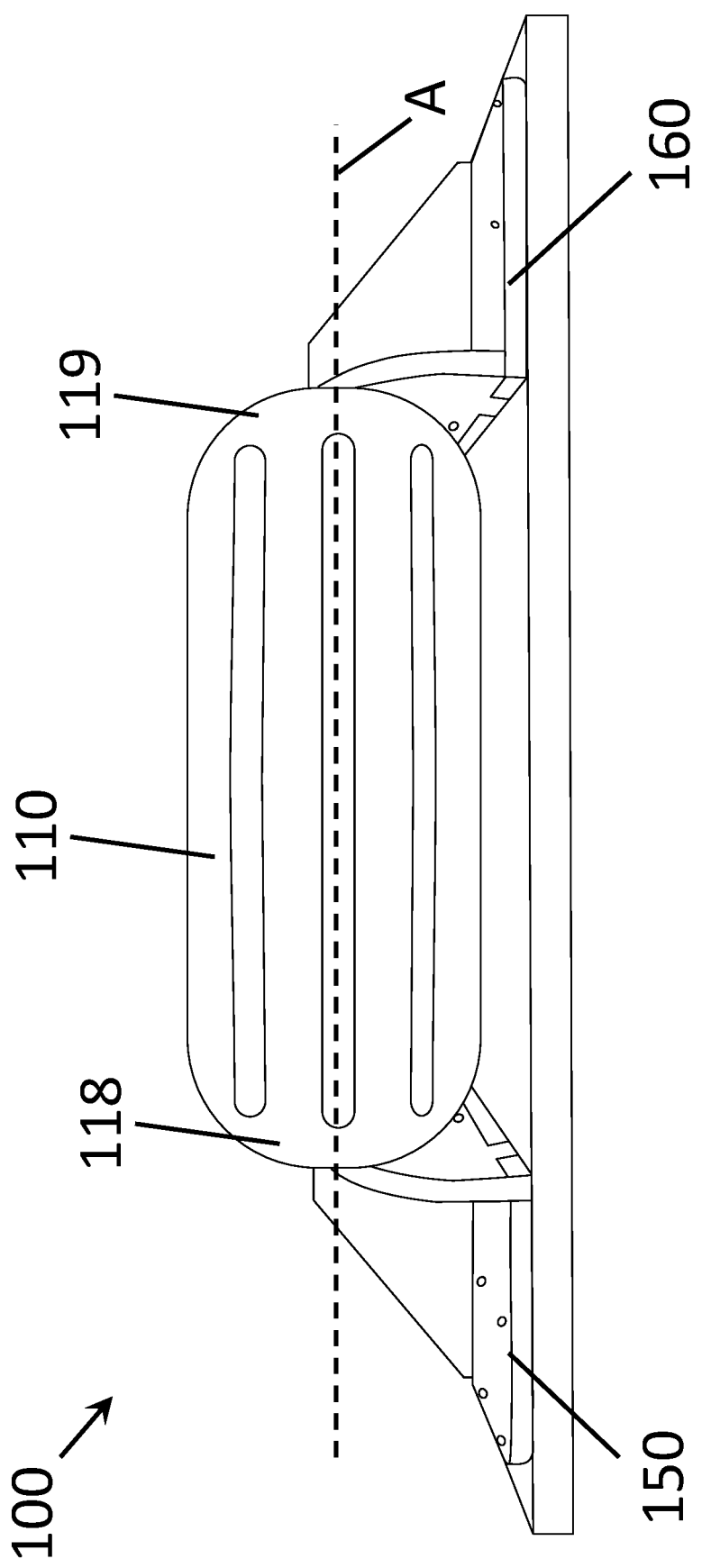
FIG. 2 shows a side perspective view of the fixed mounted fender system of FIG. 1.
Figure 3:
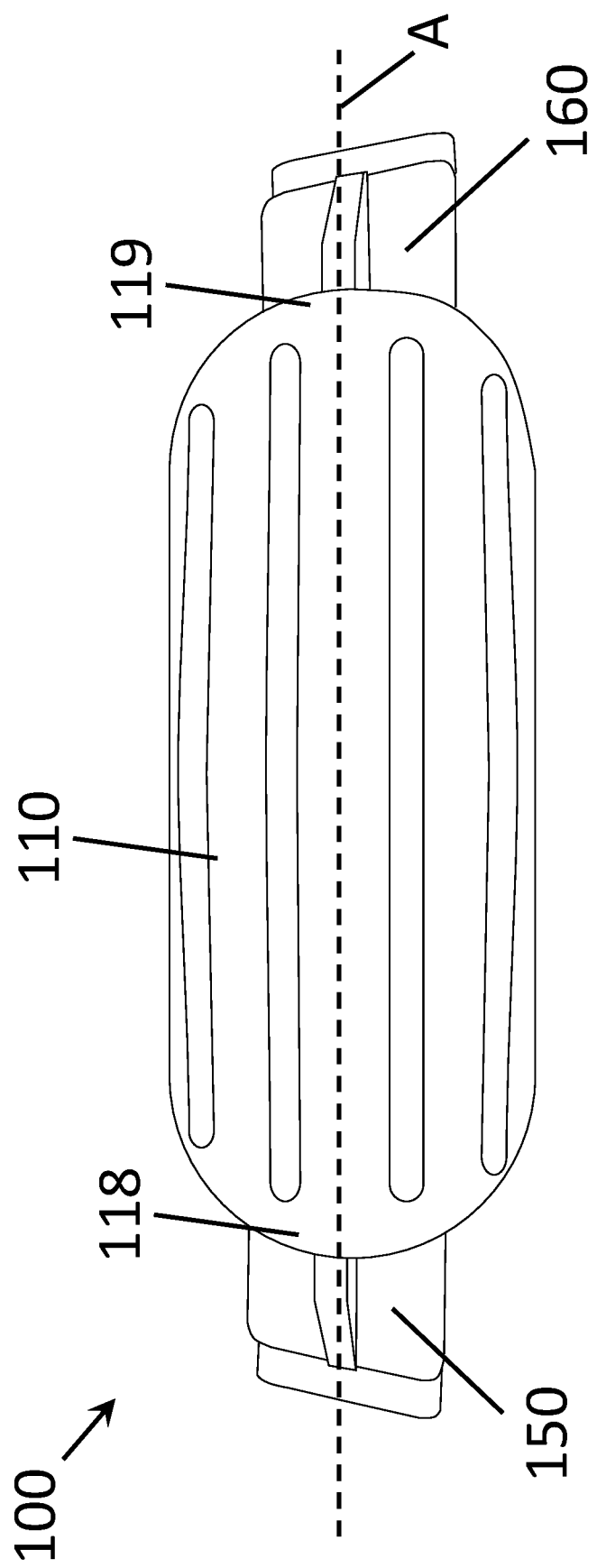
FIG. 3 shows a top perspective view of the fixed mounted fender system of FIG. 1.
Figure 4:
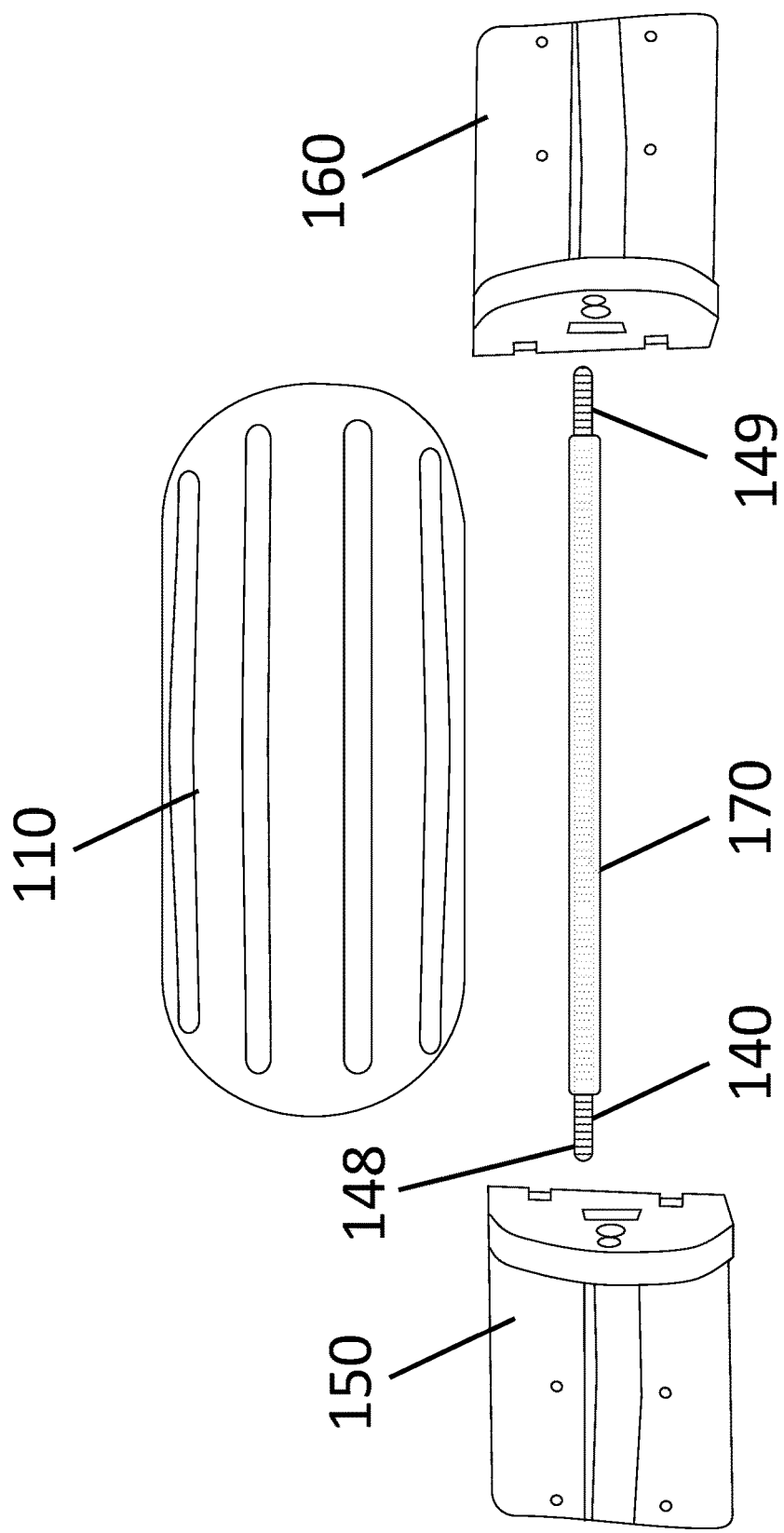
FIG. 4 shows an exploded view of the fixed mounted fender system of FIG. 1.

In the following detailed description, reference is made to the accompanying drawings, which form a part hereof. In the drawings, similar symbols identify similar components, unless context dictates otherwise. The illustrative examples described in the detailed description and drawings are not meant to be limiting and are for explanatory purposes. Other examples may be utilized, and other changes may be made, without departing from the spirit or scope of the subject matter presented herein. It will be readily understood that the aspects of the present disclosure, as generally described herein and shown in the drawings, may be arranged, substituted, combined, and designed in a wide variety of different configurations, each of which are explicitly contemplated and form a part of this disclosure.

Referring first to FIGS. 1-4, an example fixed mounted fender system 100 is shown. The system 100 generally includes a fender 110, a rod 140, and a pair of mounting brackets 150, 160. The system 100 is generally designed to be affixed (e.g., permanently) in any orientation to any type of fixed structure (e.g., seawall, piling, dock, boat lift), such as by one or more fasteners (e.g., screws, lag bolts) passing through strategically pre-drilled holes. The system 100 may thus advantageously eliminate the need for traditional fender deployments.

As depicted, the fender 110 may have a generally elongate body such that the fender 110 extends from a first end 118 to a second end 119 thereof along an axis A. The fender 110 may also define a plurality of openings. A first opening 120 may be defined at the first end 118 of the fender 110, and a second opening (not shown) may be defined at the second end 119 of the fender 110. The openings may generally be positioned on opposing end surfaces of the fender 110 such that a channel is defined through the body of the fender 110. The fender 110 may generally be of any type or design as desired to suit a particular application. By way of non-limiting example, the fender 110 may be an air-filled fender. In examples, the fender 110 may be a hole-through-middle (HTM) fender. The fender 110 may generally be of any size and/or shape as desired to suit a particular application. By way of non-limiting example, the fender 110 may have a length (along the axis A) of from about 15" to about 28", although other sizes are possible. By way of further non-limiting example, the fender 110 may have a width (perpendicular to the axis A) of from about 4" to about 10", although other sizes are possible. The fender 110 may be an HTM1 fender (4" width by 18.4" length), an HTM2 fender (6" width by 15" length), an HTM3 fender (8" width by 20" length), or an HTM4 fender (10" width by 28" length), although other examples are not so limited.

Figure 5A:
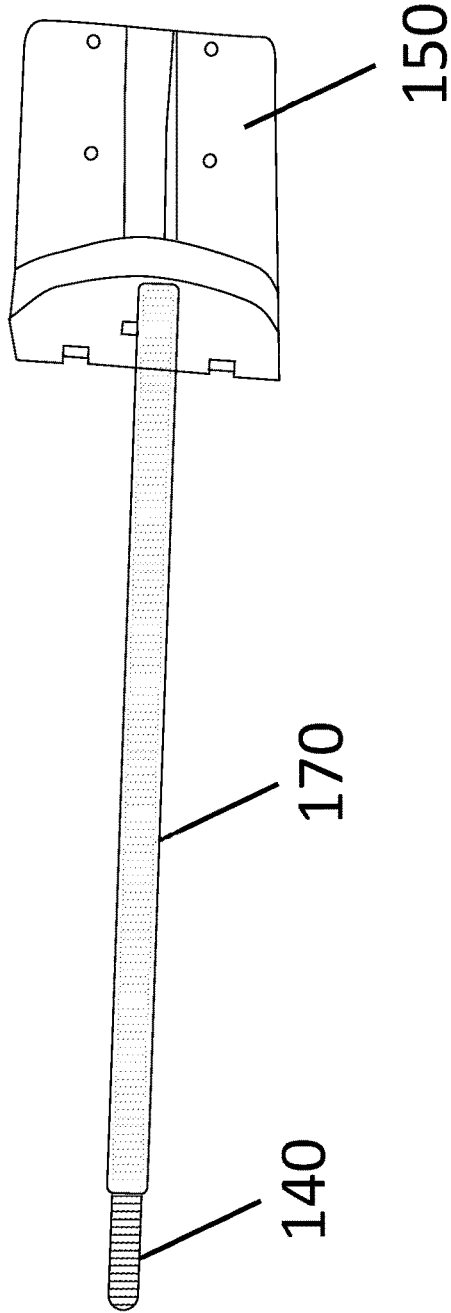
FIG. 5A shows a rod threadingly interfacing with a mounting bracket according to one example.
Figure 5B:
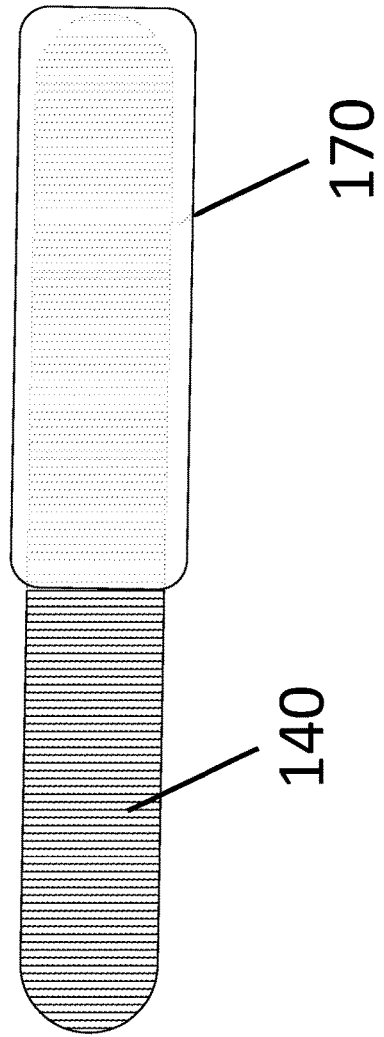
FIG. 5B shows a rod and a protective sheath surrounding the rod according to one example.
Figure 6:
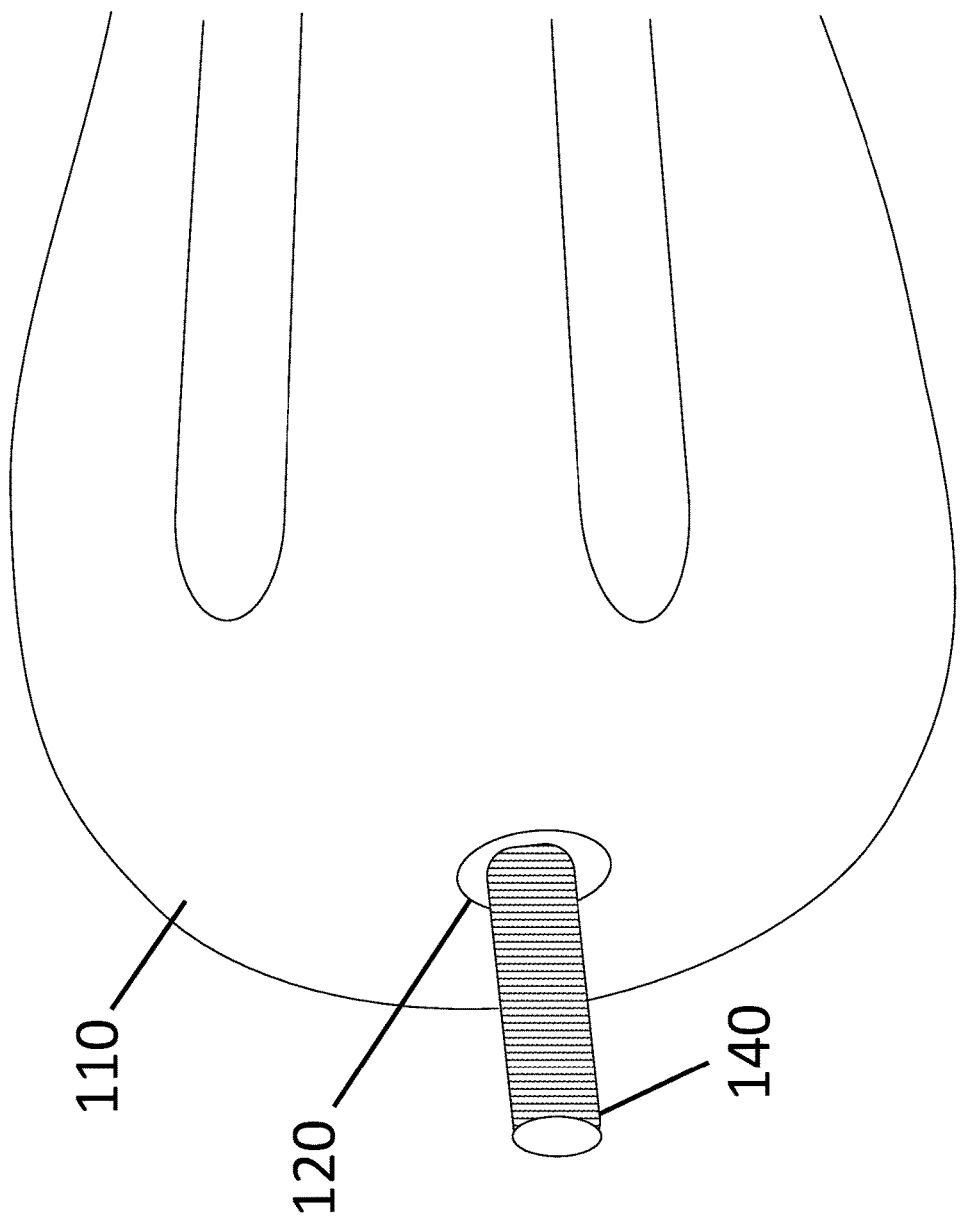
FIG. 6 shows a rod passing through an opening in an end of a hole-through-middle fender according to one example.

The system 100 also includes a rod 140. As depicted, the rod 140 may generally be elongate such that the rod 140 extends from a first end 148 to a second end 149 thereof. In use, the rod 140 generally passes through each of the openings of the fender 110, as may be seen with reference to FIG. 6. In this way, the rod 140 generally passes entirely through the fender 110. The rod 140 generally extends along the axis A. The rod 140 may generally be of any size and/or shape as desired to suit a particular application. Generally, the rod 140 is longer than the fender 110 such that the rod 140 passes entirely through the fender 110 and extends outwardly from each end thereof. The rod 140 may generally be of any type and/or material as desired to suit a particular application. By way of non-limiting example, the rod 140 may be a high-tensile metal rod. At least a portion of the rod 140 may be threaded. For example, the rod 140 may be threaded at at least the first end 148 and the second end 149 thereof. In examples, a protective sheath 170 may surround (e.g., be wrapped about) the rod 140, such as is shown in FIG. 5B. The protective sheath 170 may generally be of any type or material as desired to suit a particular application. By way of non-limiting example, the protective sheath 170 may be resistant to corrosion.

The fender 110 may be configured to rotate with respect to the rod 140. The fender 110 is configured to rotate with respect to the rod 140 about the axis A. In this way, the fender 110 may "roll" up and down with changes in tide or marine wakes, thereby minimizing or preventing undesirable rubbing against a watercraft abutting the fender 110 and retarding marring of the finish on such watercraft with unsightly black scrapes as has been known to occur with conventional, non-rotating bumpers or fenders. For example, when a watercraft contacts the fender 110 (e.g., during docking or mooring), the fender 110 advantageously provides protection, absorbs impact, and alleviates static friction, thereby mitigating damage to the watercraft.

With continued reference to FIGS. 1-4, the system 100 includes a pair of mounting brackets 150, 160. The first mounting bracket 150 generally interfaces with the rod 140 at the first end 148 thereof. Similarly, the second mounting bracket 160 generally interfaces with the rod 140 at the second end 149 thereof. In this way, the rod 140 generally extends along the axis A between the first mounting bracket 150 and the second mounting bracket 160. As described herein, in examples, the rod 140 may be threaded at each of the first end 148 thereof and at the second end 149 thereof. In such examples, the rod 140 may threadingly interface with each of the first mounting bracket 150 and the second mounting bracket 160, such as is shown in FIG. 5A. The mounting brackets 150, 160 may generally be of any size and/or shape as desired to suit a particular application. The mounting brackets 150, 160 may also generally be of any type and/or material as desired to suit a particular application. By way of non-limiting example, the mounting brackets 150, 160 may be made of marine-grade high-density polyethylene (HDPE), metal, or combinations thereof. The mounting brackets 150, 160 may advantageously allow the fender 110 positioned therebetween to absorb impact upon contact by watercraft and/or may strategically maximize the surface area of the contact portion of the fender 110 for optimal protection of watercraft contacting the fender 110.

As may be appreciated with reference to FIGS. 1-4, first mounting bracket 150 and the second mounting bracket 160 are structured the same as one another. As such, in the interest of brevity, the features of the mounting brackets will be further described with reference solely to mounting bracket 150 but will be understood as applying equally to each mounting bracket.

Figure 9A:
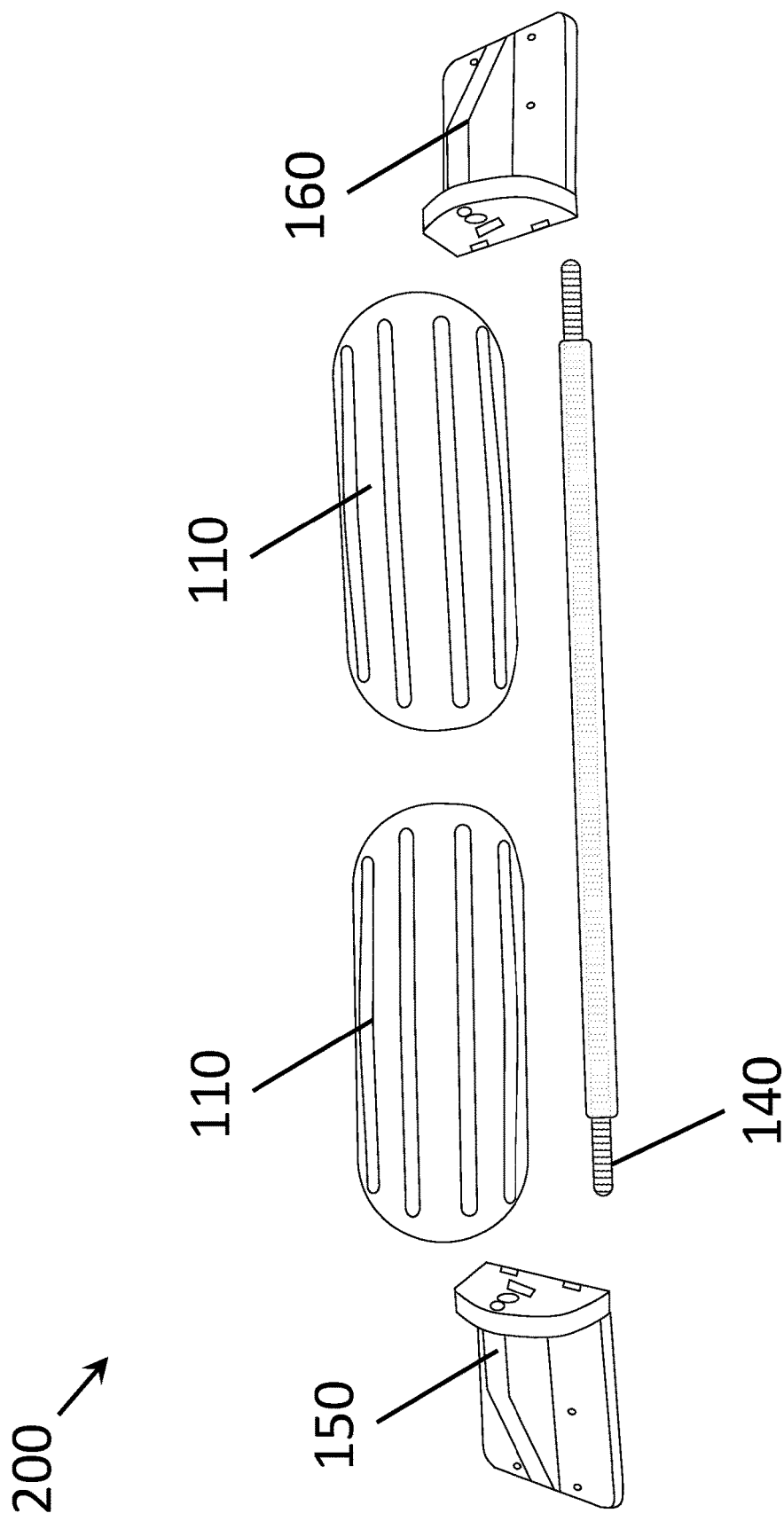
FIG. 9A shows an exploded view of a fixed mounted fender system according to one example in which the system incudes a pair fenders, a rod, and a pair of mounting brackets.
Figure 9B:
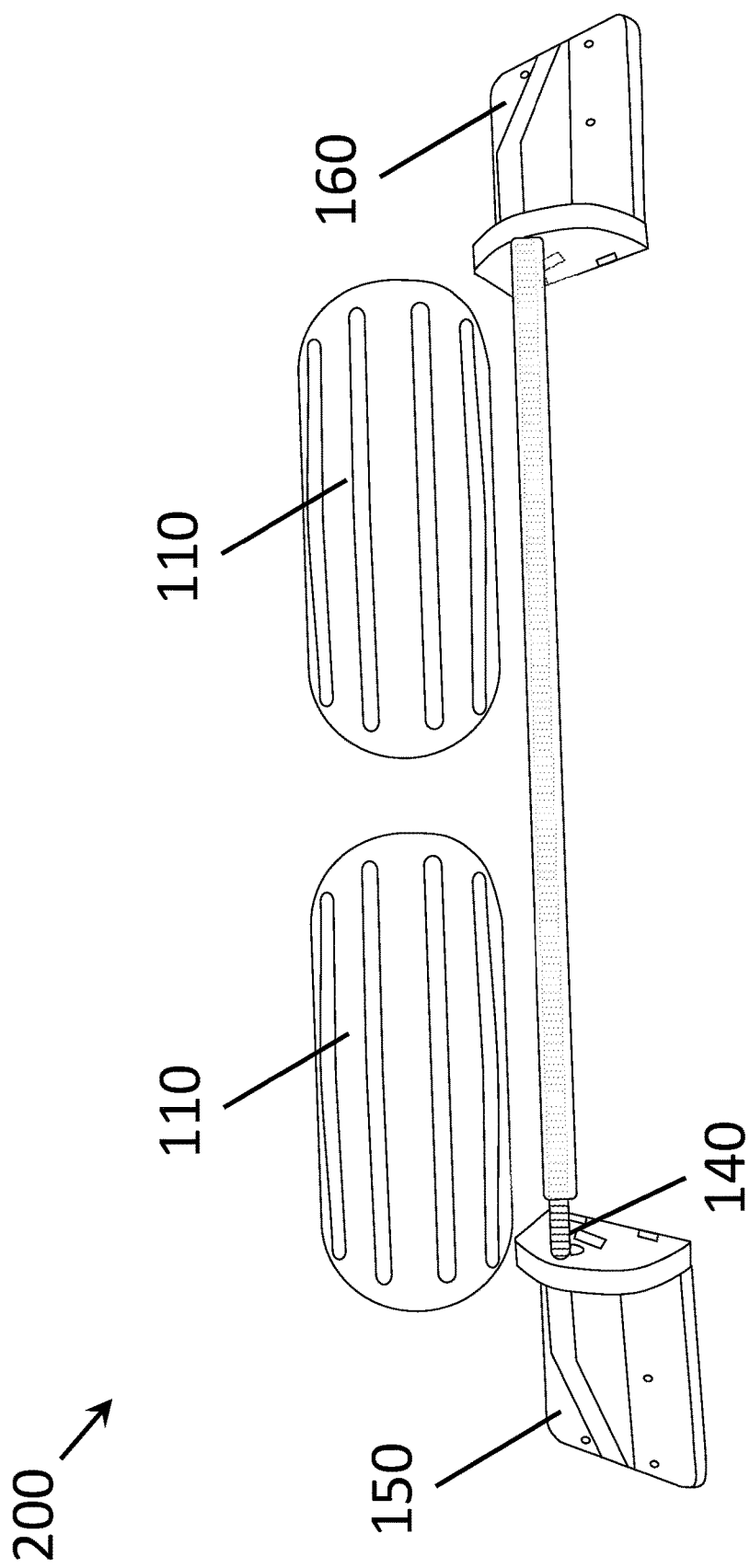
FIG. 9B shows a perspective view of the fixed mounted fender system of FIG. 9A, with one end of the rod threaded into one of the mounting brackets.
Figure 9C:
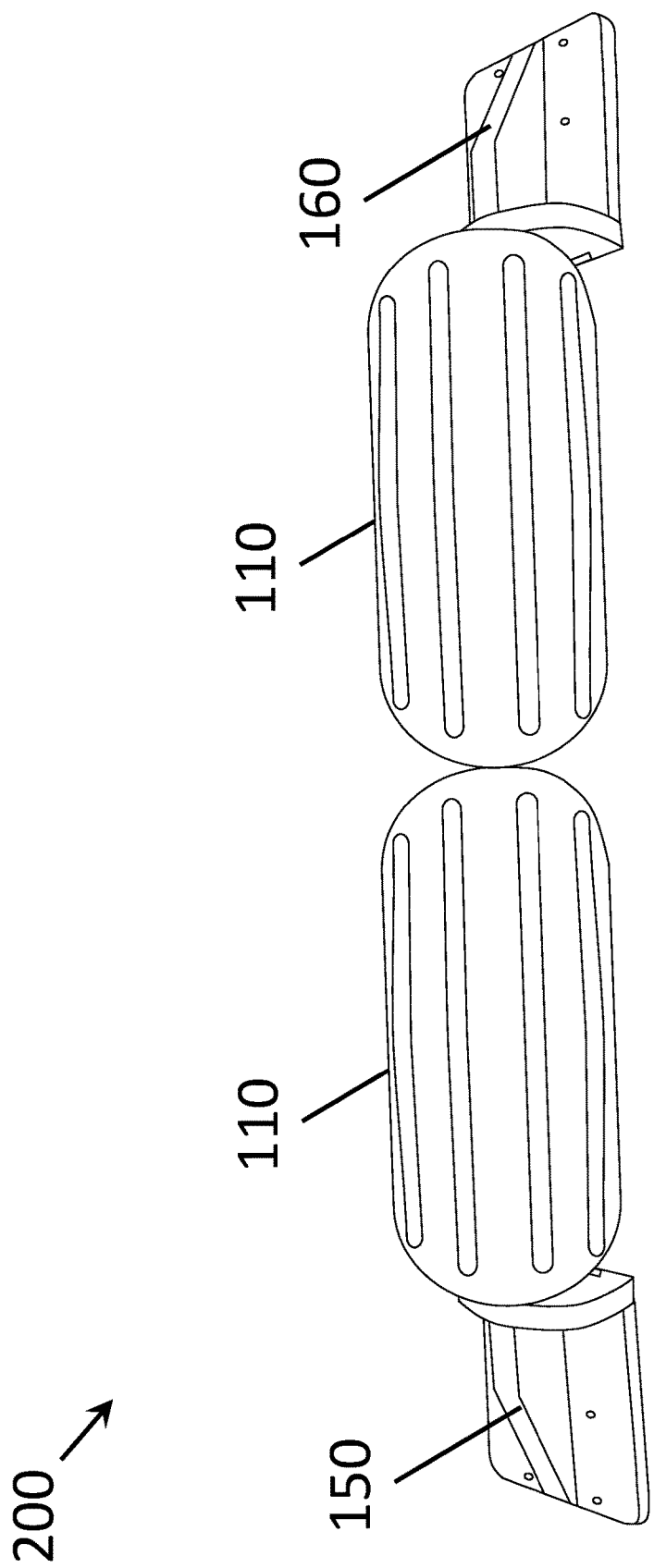
FIG. 9C shows a perspective view of the fixed mounted fender system of FIG. 9A, with the pair of fenders arranged side-by-side along the rod between the pair of mounting brackets.

As may now be appreciated, the system 100 may be assembled and attached to a fixed structure by connecting the first end 148 of the rod 140 to the first mounting bracket 150 (e.g., by threading the first end 148 of the rod 140 into the first mounting bracket 150), passing the rod 140 through each of the first opening 120 and the second opening (not shown) of the fender 110, connecting the second end 149 of the rod 140 to the second mounting bracket 160 (e.g., by threading the second end 149 of the rod 140 into the second mounting bracket 160), attaching the first mounting bracket 150 to the fixed structure, and attaching the second mounting bracket 160 to the fixed structure. The system 100 may be attached to the fixed structure in any orientation as desired to suit a particular application. By way of one non-limiting example, the system 100 may be attached to the fixed structure horizontally such that the fender 110 rotates with respect to the rod 140 about a lateral axis (i.e., with the first mounting bracket 150 and the second mounting bracket 160 laterally spaced apart from one another). By way of another non-limiting example, the system 100 may be attached to the fixed structure vertically such that the fender 110 rotates with respect to the rod 140 about a vertical axis (i.e., with the first mounting bracket 150 and the second mounting bracket 160 vertically spaced apart from one another). Without limitation as to orientation, multiple systems may be employed together (such as side-by-side and/or on opposing sides of a docking area) and/or a single system may include multiple fenders arranged side-by-side (e.g., in series). In examples utilizing multiple fenders, the fenders may be arranged side-by-side along a common rod and/or between a pair of mounting brackets (e.g., as shown with respect to system 200 in FIGS. 9A-9C), or, alternatively, additional rods and/or mounting brackets may be employed.

Figure 7:
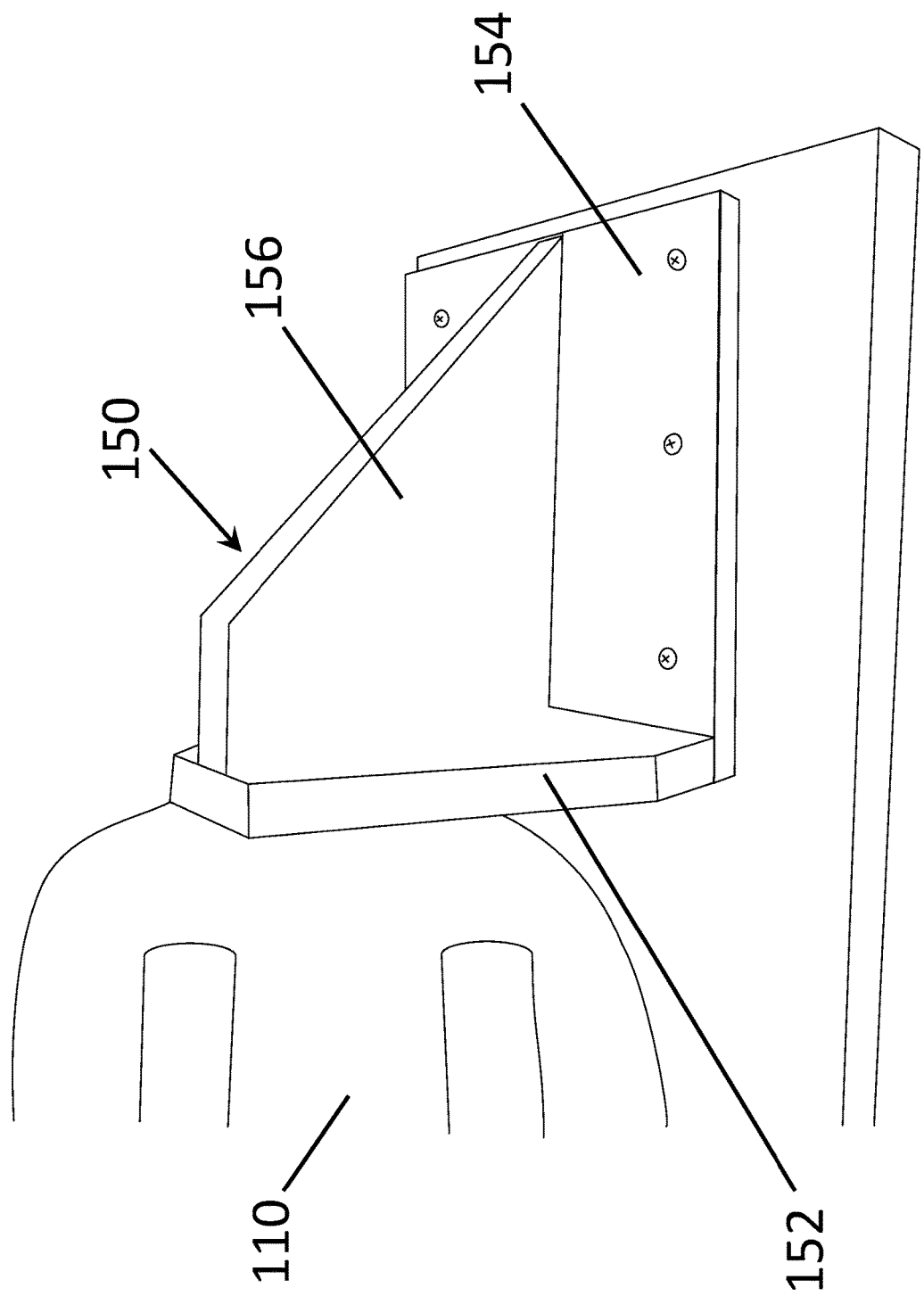
FIG. 7 shows a mounting bracket of the fixed mounted fender system of FIG. 1.
Figure 8A:
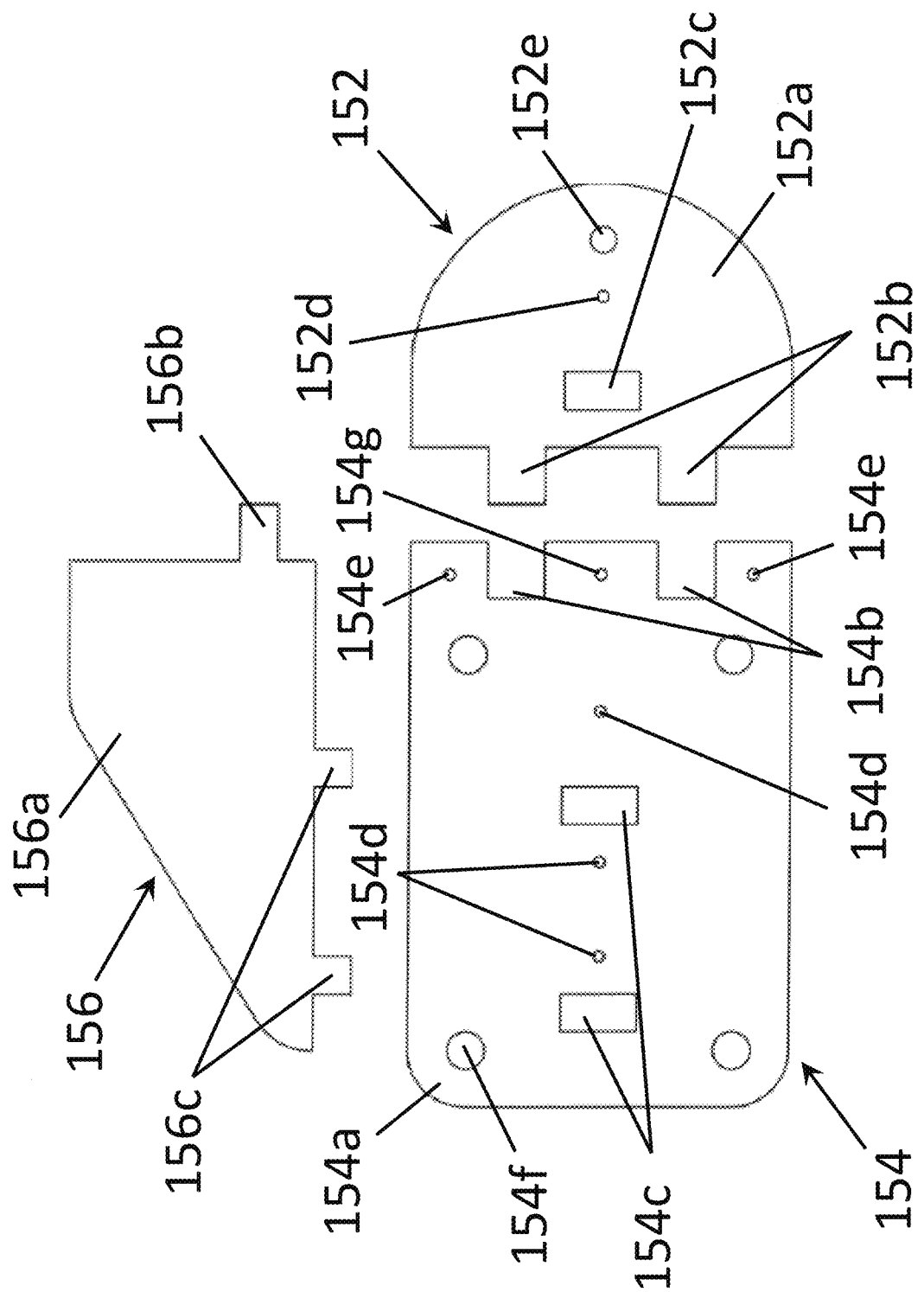
FIG. 8A shows an exploded view of a mounting bracket according to one example.
Figure 8B:
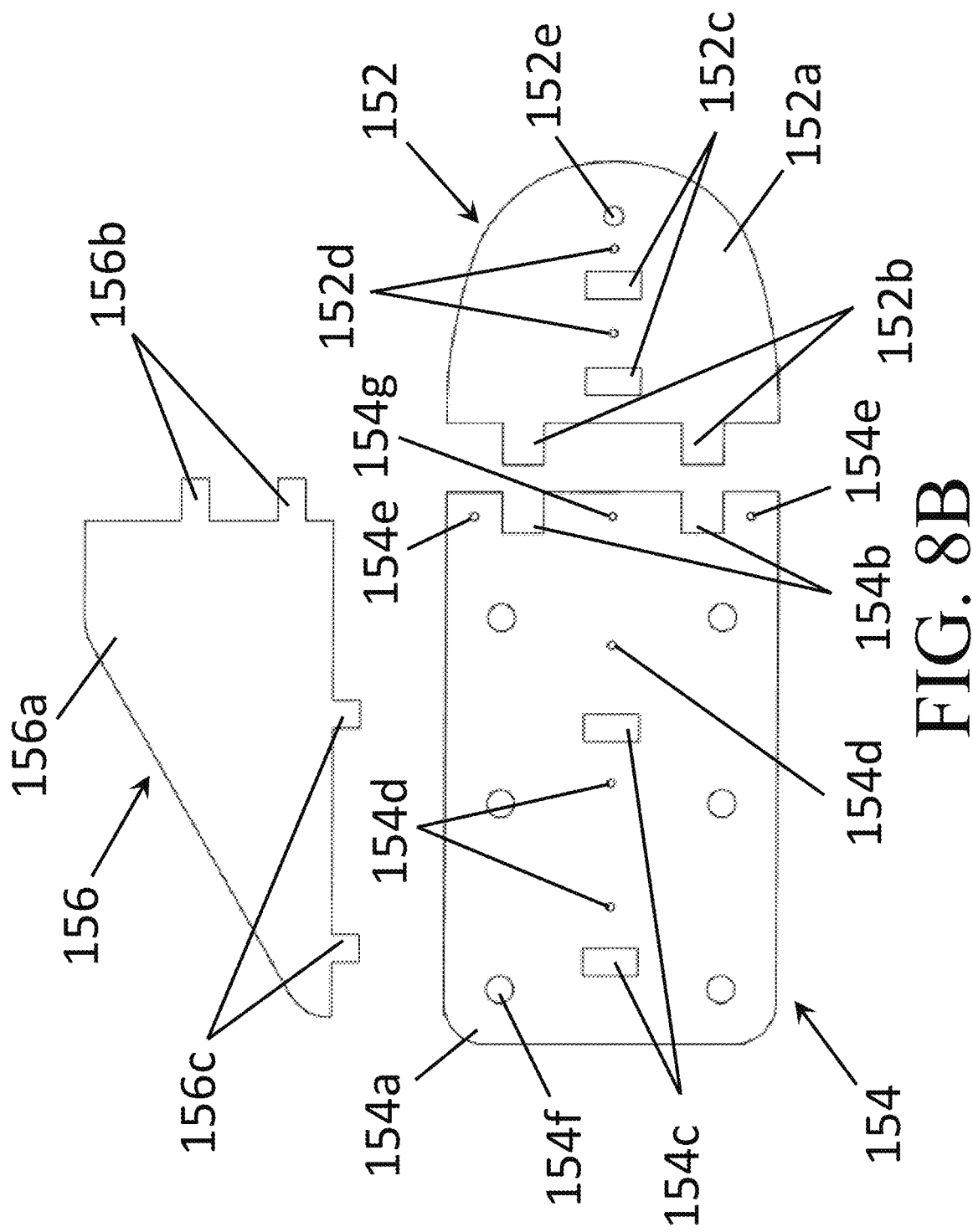
FIG. 8B shows an exploded view of a mounting bracket according to another example.

Turning now to FIGS. 7-8B, the mounting bracket 150 includes a base plate 152, an anchor plate 154, and a strut plate 156. The base plate 152 may define an elongate body 152*a*. The base plate 152 generally extends substantially perpendicular to the axis A. The base plate 152 is generally configured to interface with the rod 140 at one of the ends 148, 149 thereof. For example, the body 152*a* of the base plate 152 may define an aperture 152*e* configured to receive at least a portion of the rod 140. The aperture 152*e* may be internally tapped and configured to receive an externally threaded end of the rod 140. As will be appreciated, as the fender 110 rotates or "rolls" with respect to the rod 140 about the axis A, the rod 140 does not itself rotate with respect to the base plate 152.

The anchor plate 154 may define an elongate body 154*a*. The anchor plate 154 may be connected to the base plate 152. The anchor plate 154 generally extends substantially perpendicular to the base plate 152. The anchor plate 154 may be configured to be attached to a fixed structure (e.g., seawall, piling, dock, boat lift), such as by one or more fasteners (e.g., screws, lag bolts) passing through one or more openings 154*f* defined in the body 154*a* of the anchor plate 154.

The strut plate 156 may define an elongate body 156*a*. The strut plate 156 may be connected to the base plate 152 and the anchor plate 154. The strut plate 156 generally extends substantially perpendicular to each of the anchor plate 154 and the base plate 152.

In FIG. 8A and FIG. 8B, which show exploded views of the mounting bracket 150 according to various examples, additional features of the base plate 152, the anchor plate 154, and the strut plate 156 may be seen.

The base plate 152 may be configured to be attached to the strut plate 156 by one or more fasteners passing through one or more openings 152*d* defined in the body 152*a* of the base plate 152. The anchor plate 154 may be configured to be attached to the strut plate 156 by one or more fasteners passing through one or more openings 154*d* defined in the body 154*a* of the anchor plate 154. The anchor plate 154 may be configured to be attached to the base plate 152 by one or more fasteners passing through one or more openings 154*e* defined in the body 154*a* of the anchor plate 154. The anchor plate 154 may be configured to be attached to each of the base plate 152 and the strut plate 156 by one or more fasteners passing through one or more openings 154*g* defined in the body 154*a* of the anchor plate 154.

The base plate 152 may include one or more engagement features 152*b*, 152*c*. In examples, the base plate 152 may include a first set of engagement features 152*b* and a second set of engagement features 152*c*. The anchor plate 154 may include one or more engagement features 154*b*, 154*c*. In examples, the anchor plate 154 may include a first set of engagement features 154*b* and a second set of engagement features 154*c*. The strut plate 156 may include one or more engagement features 156*b*, 156*c*. In examples, the strut plate 156 may include a first set of engagement features 156*b* and a second set of engagement features 156*c*. It will be understood that, as used herein, the term "set" is used in the mathematical sense such that a "set" can define a plurality of elements or can define a single element (e.g., a unit set or singleton) unless otherwise defined to have a plurality of elements.

In examples, the first set of engagement features 154*b* of the anchor plate 154 may be sized and shaped complementary to and configured to engage with the first set of engagement features 152*b* of the base plate 152 so as to connect the anchor plate 154 and the base plate 152 to one another. The first set of engagement features 154*b* of the anchor plate 154 may be formed as recesses defined in the body 154*a* of the anchor plate 154, and the first set of engagement features 152*b* of the base plate 152 may be formed as projections extending outwardly from the body 152*a* of the base plate 152, although other examples are not so limited. It will also be readily appreciated that the structures of the respective engagement features may be reversed or changed as desired to suit a particular application.

In examples, the first set of engagement features 156*b* of the strut plate 156 may be sized and shaped complementary to and configured to engage with the second set of engagement features 152*c* of the base plate 152 so as to connect the strut plate 156 and the base plate 152 to one another. The first set of engagement features 156*b* of the strut plate 156 may be formed as projections extending outwardly from the body 156*a* of the strut plate 156, and the second set of engagement features 152*c* of the base plate 152 may be formed as recesses defined in the body 152*a* of the base plate 152, although other examples are not so limited. It will also be readily appreciated that the structures of the respective engagement features may be reversed or changed as desired to suit a particular application.

In examples, the second set of engagement features 156*c* of the strut plate 156 are sized and shaped complementary to and configured to engage with the second set of engagement features 154*c* of the anchor plate 154 so as to connect the strut plate 156 and the anchor plate 154 to one another. The second set of engagement features 156*c* of the strut plate 156 may be formed as projections extending outwardly from the body 156*a* of the strut plate 156, and the second set of engagement features 154*c* of the anchor plate 154 may be formed as recesses defined in the body 154*a* of the anchor plate 154, although other examples are not so limited. It will also be readily appreciated that the structures of the respective engagement features may be reversed or changed as desired to suit a particular application.

It should be noted that the drawings and descriptions of the examples are for exemplary purposes only and should not be construed as limiting the disclosure. One skilled in the art will appreciate that the present disclosure contemplates various examples. Additionally, it should be understood that the concepts described above with the above-described examples may be employed alone or in combination with any of the other examples described above. It should further be appreciated that the various alternative examples described above with respect to one illustrated example can apply to all examples as described herein, unless otherwise indicated.

Unless explicitly stated otherwise, each numerical value and range should be interpreted as being approximate as if the word "about," "approximately," or "substantially" preceded the value or range. The terms "about" and "approximately" can be understood as describing a range that is within 15 percent of a specified value unless otherwise stated.

Conditional language used herein, such as, among others, "can," "could," "might," "may," "e.g.," and the like, unless specifically stated otherwise, or otherwise understood within the context as used, is generally intended to convey that certain examples include, while other examples do not include, certain features, elements, and/or steps. Thus, such conditional language is not generally intended to imply that features, elements, and/or steps are in any way required for one or more examples or that one or more examples necessarily include these features, elements and/or steps. The terms "comprising," "including," "having," and the like are synonymous and are used inclusively, in an open-ended fashion, and do not exclude additional elements, features, acts, operations, and so forth.

While certain examples have been described, these examples have been presented by way of example only and are not intended to limit the scope of the present disclosure. Thus, nothing in the foregoing description is intended to imply that any particular feature, characteristic, step, module, or block is necessary or indispensable. Indeed, the novel methods and articles described herein may be embodied in a variety of other forms; furthermore, various omissions, substitutions, and changes in the form of the methods and articles described herein may be made without departing from the spirit of the inventions disclosed herein. The accompanying claims and their equivalents are intended to cover such forms or modifications as would fall within the scope and spirit of certain of the inventions disclosed herein.

It will be understood that reference herein to "a" or "one" to describe a feature such as a component or step does not foreclose additional features or multiples of the feature. For instance, reference to a device having or defining "one" of a feature does not preclude the device from having or defining more than one of the feature, as long as the device has or defines at least one of the feature. Similarly, reference herein to "one of" a plurality of features does not foreclose the invention from including two or more, up to all, of the features. For instance, reference to a device having or defining "one of a X and Y" does not foreclose the device from having both X and Y.

What is claimed:

1. A system, comprising:
    a fender extending from a first end to a second end thereof along an axis, the fender defining a first opening at the first end thereof and a second opening at the second end thereof;
    a rod extending from a first end to a second end thereof along the axis of the fender and passing through each of the first opening and the second opening of the fender, such that the fender is configured to rotate with respect to the rod about the axis; and
    a first mounting bracket interfacing with the rod at the first end thereof and a second mounting bracket interfacing with the rod at the second end thereof, such that the rod extends through the fender between the first mounting bracket and the second mounting bracket,
    wherein each of the first mounting bracket and the second mounting bracket includes:
        an elongate base plate extending substantially perpendicular to the axis and configured to interface with rod at a corresponding one of the first and second ends thereof:
        an elongate anchor plate connected to the elongate base plate, the elongate anchor plate extending substantially perpendicular to the elongate base plate, defining at least one opening, and configured to be attached to a fixed structure by a fastener passing through the at least one opening; and
        an elongate strut plate connected to each of the elongate anchor plate and the elongate base plate, the elongate strut plate extending substantially perpendicular to each of the elongate anchor plate and the elongate base plate.

2. The system of claim 1, wherein the fender is a hole-through-middle (HTM) fender.

3. The system of claim 1, wherein the rod is threaded at each of the first end thereof and the second end thereof, such that the rod threadingly interfaces with each of the first mounting bracket and the second mounting bracket.

4. The system of claim 1, further comprising a corrosion-resistant protective sheath surrounding at least a portion of the rod.

5. The system of claim 1, wherein the fender includes a plurality of fenders arranged side-by-side, the rod extending through each of the plurality of fenders such that each of the plurality of fenders is configured to rotate independently with respect to the rod and the rod extends through each of the plurality of fenders between the first mounting bracket and the second mounting bracket.

6. The system of wherein the claim 1, wherein the elongate base plate defines a first aperture configured to receive at least a portion of the rod.

7. The system of claim 6, wherein:
    the rod is threaded at the first end thereof;
    the first aperture is tapped and is configured to receive the threaded first end of the rod.

8. The system of claim 1, wherein:
    the elongate base plate includes one or more engagement features; and
    the elongate anchor plate includes one or more engagement features,
    wherein the one or more engagement features of the elongate anchor plate are sized and shaped complementary to and configured to engage with the one or more engagement features of the elongate base plate so as to connect the elongate anchor plate and the elongate base plate to one another.

9. The system of claim 8, wherein:
    the one or more engagement features of the elongate anchor plate are formed as recesses defined in a body of the elongate anchor plate; and
    the one or more engagement features of the elongate base plate are formed as projections extending outwardly from a body of the elongate base plate.

10. The system of claim 1, wherein:
    the elongate base plate includes one or more engagement features;
    the elongate anchor plate includes one or more engagement features; and
    the elongate strut plate includes a first set of engagement features and a second set of engagement features,
    wherein the first set of engagement features of the elongate strut plate are sized and shaped complementary to and configured to engage with the one or more engagement features of the elongate base plate so as to connect the elongate strut plate and the elongate base plate to one another, and
    wherein the second set of engagement features of the elongate strut plate are sized and shaped complementary to and configured to engage with the one or more engagement features of the elongate anchor plate so as to connect the elongate strut plate and the elongate anchor plate to one another.

11. The system of claim 10, wherein:
    the one or more engagement features of the elongate base plate are formed as recesses defined in a body of the elongate base plate;

the one or more engagement features of the elongate anchor plate are formed as recesses defined in a body of the elongate anchor plate;

the first set of engagement features of the elongate strut plate are formed as projections extending outwardly from a body of the elongate strut plate; and the second set of engagement features of the elongate strut plate are formed as projections extending outwardly from the body of the elongate strut plate.

12. A method of attaching the system of claim 1 to a fixed structure, the method comprising:

connecting the first end of the rod to the first mounting bracket;

passing the rod through each of the first opening and the second opening of the fender;

connecting the second end of the rod to the second mounting bracket;

attaching the first mounting bracket to the fixed structure; and attaching the second mounting bracket to the fixed structure.

13. The method of claim 12, wherein the rod is threaded at each of the first end thereof and the second end thereof, the method further comprising:

connecting the first end of the rod to the first mounting bracket includes threading the first end of the rod into the first mounting bracket; and connecting the second end of the rod to the second mounting bracket includes threading the second end of the rod into the second mounting bracket.

14. The method of claim 12, wherein the first mounting bracket and the second mounting bracket are laterally spaced apart from one another, such that the fender rotates with respect to the rod about a lateral axis.

15. The method of claim 12, wherein the first mounting bracket and the second mounting bracket are vertically spaced apart from one another, such that the rotates with respect to the rod about a vertical axis.

16. The method of claim 12, further comprising wrapping a protective sheath with respect to the rod.

17. A system, comprising:

a hole-through-middle (HTM) fender extending from a first end to a second end thereof along an axis, the fender defining a first opening at the first end thereof and a second opening at the second end thereof;

a rod extending from a threaded first end to a threaded second end thereof along the axis of the fender and passing through each of the first opening and the second opening of the fender, such that the fender is configured to rotate with respect to the rod about the axis;

a protective sheath surrounding at least a portion of the rod;

a first mounting bracket into which the first end of the rod is threaded and a second mounting bracket into which the second end of the rod is threaded, such that the rod extends through the fender between the first mounting bracket and the second mounting bracket, wherein each of the first mounting bracket and the second mounting bracket includes:

an elongate base plate extending substantially perpendicular to the axis and configured to threadingly receive the rod at a corresponding one of the first and second ends thereof, the elongate base plate including a first set of engagement features and a second set of engagement features;

an elongate anchor plate connected to the elongate base plate, the elongate anchor plate extending substantially perpendicular to the elongate base plate and including a first set of engagement features and a second set of engagement features; and an elongate strut plate connected to each of the elongate anchor plate and the elongate base plate, the elongate strut plate extending substantially perpendicular to each of the elongate anchor plate and the elongate base plate and including a first set of engagement features and a second set of engagement features, wherein the first set of engagement features of the elongate anchor plate are sized and shaped complementary to and configured to engage with the first set of engagement features of the elongate base plate so as to connect the elongate anchor plate and the elongate base plate to one another, wherein the first set of engagement features of the elongate strut plate are sized and shaped complementary to and configured to engage with the second set of the engagement features of the elongate base plate so as to connect the elongate strut plate and the elongate base plate to one another, and wherein the second set of engagement features of the elongate strut plate are sized and shaped complementary to and configured to engage with the second set of engagement features of the elongate anchor plate so as to connect the elongate strut plate and the elongate anchor plate to one another.

* * * * *